(12) United States Patent
Collings et al.

(10) Patent No.: US 7,873,274 B2
(45) Date of Patent: Jan. 18, 2011

(54) METHODS AND SYSTEMS TO STABILIZE AN OPTICAL NETWORK AGAINST NODAL GAIN CHANGES

(75) Inventors: Brandon C. Collings, Middletown, NJ (US); Douglas J. Beckett, Kanata (CA); Sanjay Choudhary, Elkridge, MD (US)

(73) Assignee: Ciena Corporation, Linthicum, MD (US)

( * ) Notice: Subject to any disclaimer, the term of this patent is extended or adjusted under 35 U.S.C. 154(b) by 836 days.

(21) Appl. No.: 11/786,143

(22) Filed: Apr. 10, 2007

(65) Prior Publication Data

US 2008/0253764 A1   Oct. 16, 2008

(51) Int. Cl.
*H04B 10/08* (2006.01)

(52) U.S. Cl. ............................. 398/37; 398/18; 398/38

(58) Field of Classification Search .................. 398/9, 398/11, 18, 32–34, 37–38, 94
See application file for complete search history.

(56) References Cited

U.S. PATENT DOCUMENTS

| | | | | |
|---|---|---|---|---|
| 2004/0086274 A1* | 5/2004 | Wan et al. | | 398/9 |
| 2004/0156095 A1* | 8/2004 | Tsuzaki et al. | | 359/334 |
| 2005/0146782 A1* | 7/2005 | Takeyama et al. | | 359/337.1 |
| 2006/0203329 A1* | 9/2006 | Nishihara et al. | | 359/337 |
| 2009/0116841 A1* | 5/2009 | Yang et al. | | 398/83 |

\* cited by examiner

*Primary Examiner*—Dzung D Tran
(74) *Attorney, Agent, or Firm*—Clements Bernard PLLC; Christopher L. Bernard; Tyler S. Brown

(57) ABSTRACT

The present invention provides methods and systems to stabilize an optical network against nodal gain changes through two nested control loops for controlling node gain and node output power. The present invention includes two nested control-loops running at different update speeds including: an inner, faster, control-loop which sets the gains and losses within a node to achieve a node-gain target, and a node-gain target for the inner loop is set by an outer, slower, control loop that whose target is the node output power. Advantageously, the present invention reduces the problem of concatenated overshoot by minimizing the control-loop response to events that occur at other nodes.

15 Claims, 10 Drawing Sheets

FIG. 1. *Prior Art*

METHODS AND SYSTEMS TO STABILIZE AN OPTICAL NETWORK AGAINST NODAL GAIN CHANGES

FIELD OF THE INVENTION

The present invention relates generally to optical networks. More specifically, the present invention relates to methods and systems to stabilize an optical network against nodal gain changes through two nested control loops for controlling node gain and node output power.

BACKGROUND OF THE INVENTION

Fiber-optic transmission networks provide transmission for multiple channels using wavelength division multiplexing (WDM). Optical amplifiers, such as erbium-doped fiber amplifiers (EDFAs), provide a mechanism for boosting power after the multiple channels are attenuated due to fiber loss after being transmitted over a distance. Additionally, fiber-optic transmission networks can include other components, such as variable optical attenuators (VOAs), wavelength selective switches (WSSs), wavelength blockers, and the like, which in addition to other functionality can adjust per channel power (or per group of channels).

Referring to FIG. 1, an exemplary fiber-optic network 5 is illustrated showing a single transmission path. Fiber-optic networks typically include both a transmit and receive path for bidirectional communication, but FIG. 1 only depicts a unidirectional path for simpler illustration purposes. Topologies of fiber-optic transmission networks include ring, linear, mesh, and combinations thereof. FIG. 1 illustrates a ring topology with a linear spur through a reconfigurable optical add-drop multiplexer (ROADM) 9. The network 5 is shown with four nodes 400 each including a pre-amplifier 14 located at the input to the nodes and a post-amplifier 18 located at the output of the nodes. The pre-amplifier 14 provides optical amplification prior to de-multiplexing of wavelengths, and the post-amplifier 18 provides optical amplification after multiplexing of wavelengths prior to transmission on a fiber 402.

Each of the nodes 400 illustrated in FIG. 1 include a mid-stage point between the pre- and post-amplifiers 14,18 including a fixed optical add-drop multiplexer (OADM) 6, a variable optical attenuator (VOA) 7, and the ROADM 9. Each of the components 6,7,9 is capable of providing per channel or per group of channels attenuation on wavelengths that are added, dropped, or expressed through the node.

The stability and setting accuracy of optical powers within fiber-optic transmission networks 5 is a universal goal of equipment providers and network operators. The amplifiers 14,18 and attenuation components 6,7,9 each are adjusted to account for different power levels based on a variety of factors, such as channel count. A common obstacle in meeting the stability and setting accuracy goal is the change that occurs in optical gain for channels that are active after a system event. Such an event can include unplanned (e.g., through equipment failure or fiber cut) or planned (e.g., addition or deletion of channels) changes in the number of channels passing through the amplifiers.

Optical power-control-loops are designed to counter individual or collective power changes. For example, these optical power-control-loops are configured to dynamically provide attenuation to individual channels through the various components 6,7,9. However, many concatenated power-control-loops operating in series will result in an over-reaction and an overshoot in the response. Typically, optical power-control-loops are included in fiber-optic transmission networks. These operate at a circuit level in automatic-gain or automatic-power mode to obtain the desired output power into following fibers and devices. With automated power control comes the need for closed control loops. Open-loop, i.e. "set-and-forget", operation is not possible with the specifications available on many control-point components (e.g., VOAs, wavelength selective switch (WSS) attenuation in ROADMs).

In addition, with the advent of per-channel attenuation provided by wavelength switches and blocker devices, automatic-power control loops are constructed, encompassing multiple optical functions acting in series, to achieve target powers on every wavelength and may counteract wavelength-dependent changes. An example would be the concatenated gain of a per-wavelength attenuation device followed by an optical amplifier device. Such combinations are common in practice.

The shortcoming of a single control loop designed to maintain output power from a node into optical fiber is that when such loops are concatenated in series, control-loops operating in many different nodes react to an event occurring only at one node. The summed reaction is thus greater than needed to compensate for the event and power over-shoot will occur. Alternatively, to minimize overshoot, the control-loop speed may be reduced for all nodes, but the effects of the event are then prolonged.

BRIEF SUMMARY OF THE INVENTION

In various exemplary embodiments, the present invention provides methods and systems to stabilize an optical network against nodal gain changes through two nested control loops for controlling node gain and node output power. The present invention is relevant to optical channels that traverse a node (i.e., express channels) and includes two nested control-loops running at different update speeds: the inner, faster, control-loop sets the gains and losses within a node to achieve a node-gain target (constant node gain or CNG loop); the node-gain target for the inner loop is set by an outer, slower, control loop that whose target is the node output power (constant output power or COP loop).

Advantageously, the present invention reduces the problem of concatenated overshoot by minimizing the control-loop response to events that occur at other nodes. The control loops can be run collectively on the powers of channels collectively or individually on single channels, if that granularity of control exists. The present invention uses a concept of node gain (i.e., ratio of output to input powers for express channels in linear units (mW) or difference between the powers in units of dB). Additionally, the present invention separates node gain from node output power, and separates node gain from the gain of preceding and following nodes in the network. The use of control loops permits automated adaptation to physical-layer variability, such as filter losses and amplifier ripple, and to physical-layer dynamic changes such as span-loss aging and amplifier gain-spectrum changes with different conditions of spectral loading. Additionally, the present invention enables automated channel pre-emphasis via the use of another (third) control loop running slower than the outer COP loop. The pre-emphasis loop adjusts the per-channel output power targets at each upstream channel ingress node to obtain optimal optical signal-to-noise ratio (OSNR) at the downstream channel egress node.

In an exemplary embodiment of the present invention, a nested control loop method to stabilize an optical network against nodal gain changes includes monitoring per channel power levels at a node input and node output, computing a per channel node gain based on the difference between output and input per channel power levels, computing a per channel target node gain, wherein the per channel target node gain is the difference between the per channel power level from the node output and a current output channel power target, adjusting attenuation settings responsive to the difference between the per channel target node gain to the per channel node gain, and adjusting optical amplifier gain so that per channel attenuation settings are within allowable ranges. The nested control loop method further includes time-averaging the per channel power levels from the node input and node output, wherein time-averaging decreases the impact of transient changes on the monitored per channel power levels. The current output channel power target is responsive to provisioned channel output power and channel pre-emphasis. The adjusting attenuation settings step includes adjusting one of per channel attenuation, per channel group attenuation, and combinations thereof. The adjusting optical amplifier step includes reducing the amplifier gain responsive to a maximum value of either a maximum allowable gain change and a maximum attenuation setting above an allowable range. The monitoring step is performed by an optical channel monitor coupled to a network controller, and wherein the network controller performs the computing and adjusting steps. The nested control loop method further includes detecting a relative imbalance in per channel power levels at the node input resulting from a channel dependent gain/loss performance between channels, and implementing complementary channel power level adjustments, based on the relative imbalance, at an output at an upstream node(s) so as to minimize the degrading impact of the channel dependence. The method is configured to maximize the optical amplifier gain to minimize a noise figure of the optical amplifier.

In another exemplary embodiment of the present invention, an optical node configured with two nested control loops for controlling node gain and node output power to stabilize against nodal gain changes includes an optical amplifier, attenuation means connected to the optical amplifier, wherein the attenuation means is configured to provide variable attenuation per channel and per group of channels, an optical channel monitor configured to monitor per channel optical power at an input to the optical amplifier and an output of the optical amplifier, and a node controller communicatively coupled to the optical amplifier, the attenuation means, and the optical channel monitor, and wherein the node controller is configured to perform an inner, faster, constant node gain control-loop to maintain a constant relative difference between channel power at the input to the optical amplifier and channel power at the output of the optical amplifier, and perform an outer, slower, constant output power control-loop to compare the channel power at the output of the optical amplifier to a channel power target for each channel and subsequently make corrections to a target node gain to bring the channel power at the output of the post amplifier equal to the channel power target, wherein the target node gain is utilized by the constant node gain control-loop. Optionally, the attenuation means includes a reconfigurable optical add-drop multiplexer comprising a wavelength selective switch equipped with per port variable attenuation. The attenuation means is operable to adjust one of per channel attenuation, per channel group attenuation, and combinations thereof. The node controller is further configured to perform a Pre-Emphasis control loop. The optical node further includes a second optical amplifier, a reconfigurable optical add-drop multiplexer, wherein the reconfigurable optical add-drop multiplexer is configured to route channels received by the optical amplifier to the second optical amplifier, and the node controller is configured to perform the constant node gain control-loop and the constant output power control-loop between both the optical amplifier and the second optical amplifier. The reconfigurable optical add-drop multiplexer includes the attenuation means.

In yet another exemplary embodiment of the present invention, a processor-based method of stabilizing an optical node against gain changes includes performing a constant node gain control-loop to maintain a constant relative difference between channel power at a node input and a node output, and performing a constant output power control-loop to compare channel power at the node output to a stored target output channel power target to bring the channel power at the output to the stored target output channel power, wherein the constant output power control-loop operates slower than the constant node gain loop, and wherein the constant output power control-loop computes a target node gain for the constant node gain control-loop, and the constant node gain control-loop keeps the node insulated from external events. The processor-based method further includes performing a Pre-Emphasis control loop. The performing a constant node gain control-loop step includes maintaining the relative difference between channel power at the node input and the node output for only express channels by comparing a target gain computing by the constant output power control-loop with measured current gain. The comparing utilizes proportional-integral-derivative controller input with a gain error including the difference between measured current gain of a channel to target gain. The performing a constant output power control-loop step includes generating a target gain on every express channel by comparing channel power at the node output to a target output power. The generating utilizes proportional-integral-derivative controller input with a gain error.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides methods and systems to stabilize an optical network against nodal gain changes through two nested control loops for controlling node gain and node output power. The present invention is relevant to optical channels that traverse a node (i.e., express channels) and includes two nested control-loops running at different update speeds: the inner, faster, control-loop sets the gains and losses within a node to achieve a node-gain target (hereinafter referred to as the constant node gain or CNG loop); the node-gain target for the inner loop is set by an outer, slower, control loop that whose target is the node output power (hereinafter referred to as the constant output power or COP loop).

Advantageously, the present invention reduces the problem of concatenated overshoot by minimizing the control-loop response to events that occur at other nodes. The control loops can be run collectively on the powers of channels collectively or individually on single channels, if that granularity of control exists. The present invention uses a concept of node gain (i.e., ratio of output to input powers for express channels in linear units (mW) or difference between the powers in units of dB). Additionally, the present invention separates node gain from node output power, and separates node gain from the gain of preceding and following nodes in the network to minimize responses to events that occur at other nodes.

Figure 2:
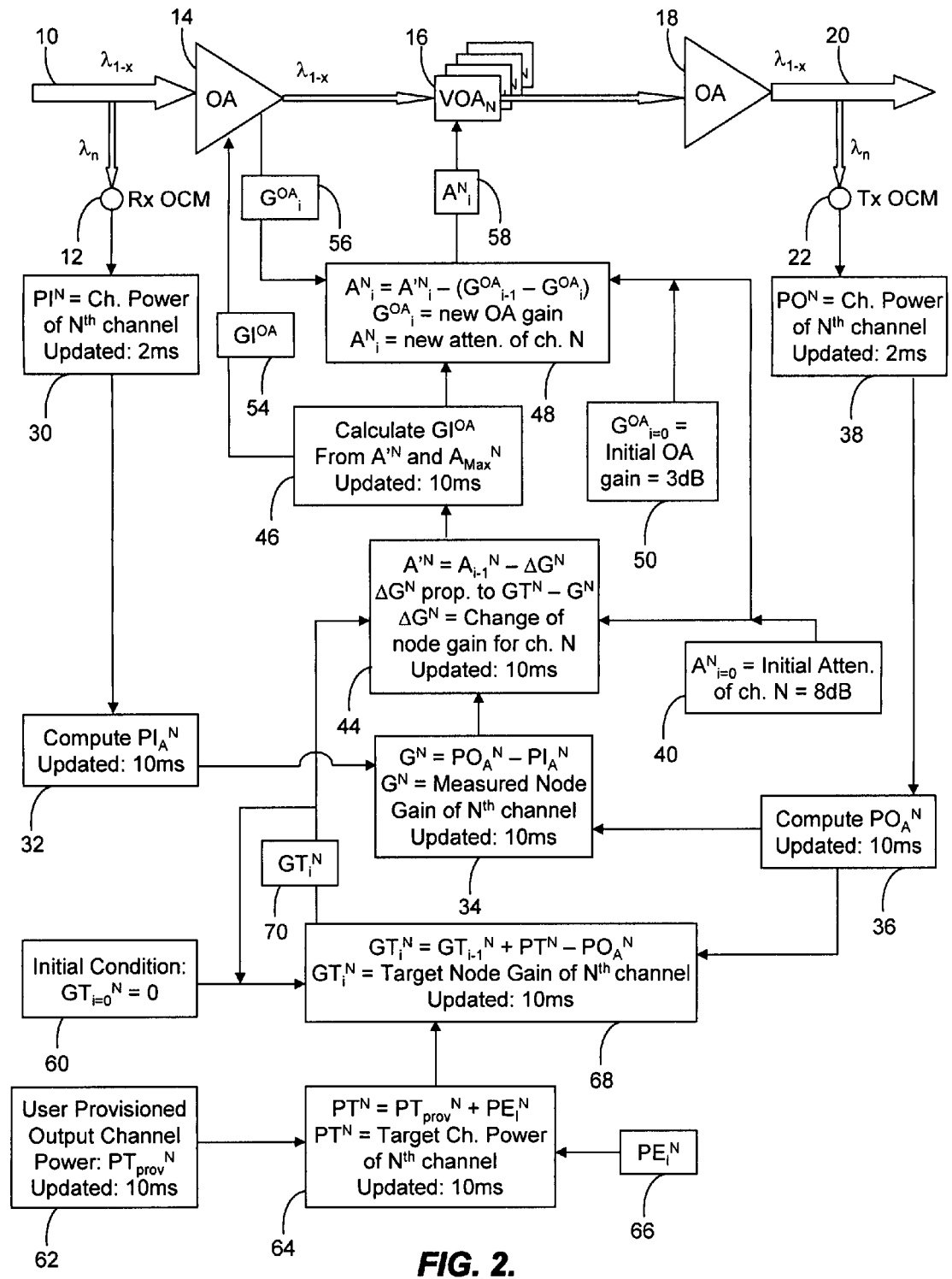
FIG. 2 illustrates a node including amplifiers and VOAs with a flowchart depicting an exemplary embodiment of the nested control loops of the present invention.

Referring to FIG. 2, the CNG loop (steps 30 through 58) is configured to maintain constant relative difference between the channel power at a node input 10 and a node output 20, and the COP loop (steps 60 through 70) is configured to maintain constant launch power out of the node degree, i.e. the node output 20. A degree is the portion of the node containing the amplifiers, multiplexer or de-multiplexer functions and management function for wavelengths and service channels that are associated with a particular bidirectional fiber connection. The COP loop fulfills channel power settings and equalization requirements, as is traditionally, manually, done. However, the COP loop, running on multiple nodes in series, will over-react to upstream transients and cause system oscillations unless the faster CNG loop is used to keep nodes insulated from external events. The COP loop sets the CNG loop per-channel-node-gain targets, and effects output power targets via the CNG loop.

The node input 10 receives a plurality of wavelengths 1 to x, and is equipped with a receive optical channel monitor (Rx OCM) 12 configured to provide the per wavelength power of each of the plurality of wavelengths at the input 10. OCMs measure power for each channel, and typically include a plurality of photo-detectors. All of the plurality of wavelengths are input to optical amplifiers 14,18 (hereinafter referred to as "OA"), such as an erbium doped fiber amplifier (EDFA), semiconductor optical amplifier, or the like. The optical amplifier 14,18 utilizes stimulated emission in the amplifier's gain medium to produce amplification in the plurality of wavelengths.

VOAs 16 are included in the mid-stage between the optical amplifiers 14,18. The VOAs 16 provide variable attenuation per wavelength, and can be stand-alone devices or included on a WSS. For example, the VOAs 16 can be configured to provide attenuation settings between 0 and 8 dB per wavelength. Additionally, the mid-stage of the amplifiers 14,18 can include components, such as remotely-configurable optical add-drop multiplexers (ROADMs) for branching one or more wavelengths to other degrees, where a degree is a fiber pair. For example, adding another degree to FIG. 1 would include adding a third amplifier taking one or more wavelengths from amplifier 14. As described herein, VOAs 16 refer generically to attenuation provided per channel or per groups of channels to express channels in between OAs 14,18. The VOAs 16 can include ROADMs, OADMs, or any other device capable of provided variable and adjustable optical attenuation to individually channels or groups of channels.

Finally, the output 20 of the amplifier 18 includes a transmit OCM (TX OCM) 22 configured to provide the per wavelength power of each of the plurality of wavelengths at the output 20. The CNG and COP loops utilize the per wavelength powers from the OCMs 12,22 to control the gain of the optical amplifiers and the attenuation of the VOAs 16 to stabilize the node against gain changes. Those of ordinary skill in the art will recognize the methods and systems of the present invention apply equally to multiple degree systems with the nested control loops operating between amplifiers in each degree on the wavelengths expressing through that degree. A single degree is depicted for illustration purposes.

The goal of the CNG control loop (steps 30 through 58) is to maintain a target amount of gain through the node for each channel traversing the degree, or for groups of channels traversing the degree. The node gain is computed as the ratio (in linear units (mW) or difference between the powers in units of dB) between the respective channel power at the output from the node and the input to the node. Additionally, the CNG control loop maintains a constant optical power at the receivers wavelengths dropping at the node.

The CNG and COP control loops utilize periodic timing update intervals. Those of ordinary skill in the art will understand these values can be adjusted accordingly as needed, and the values present herein are for illustration purposes. The OCM 12 is distributing the measured optical powers of each channel in the in the inbound (Rx) direction every 2 ms. Similarly, the measure output powers of each of the channels in the outbound (Tx) direction every 2 ms, offset from the Rx power measurements by 1 ms. Alternatively, the power measurements could be synchronized.

The outputs of the CNG loop are a desired amount of gain for the respective OA 14,18 as well as attenuation settings for each channel or channel group provisioned through the VOAs 16 (e.g., the VOAs 16 are on a WSS in a ROADM). Note that the gain of the OA 14,18 and the attenuations of the VOAs 16 both act to affect the power of each given channel or channel group. A ROADM module can affect the attenuation levels of all channels independently in both the drop and express directions. A fixed optical add-drop module (OADM) typically can only affect the attenuation levels of groups of channels independently in both the drop and express directions. Both the ROADM and OADM modules independently affect the channel powers of added channels. The gain of the OA 14,18 affects the power levels of all channels effectively equally. Therefore, the power of a channel can be increased by either increasing/decreasing the gain of the OA 14,18 or by decreasing/increasing the current respective attenuation setting of the VOAs 16.

The node gain each channel experiences is simply the ratio of the measured channel output to input powers. In one embodiment, the relative timing of the Rx and Tx OCM 12,22 channel power measurements is not controlled or synchronized. As the time needed for the optical signal to propagate between the TX and RX OCMs 12,22 is less than 30 μs and edge transients of <1 ms must be considered, any pair of Tx and RX OCM 12,22 measurements may not be sampling the same point in time of the optical signal. As the ratio of the Rx and Tx OCMs 12,22 will provide the feedback to the CNG loop, Tx and Rx OCM 12,22 measurements which occur on either side of a transient change in the channel power incident on the node will result in an incorrect measurement of the current node gain for that channel. Therefore, a number of Rx and Tx OCM 12,22 measurements will be averaged for each channel and the node gain will be computed from those averages. This will decrease the impact transient changes in the channel power will have on the measurement of the node gain. In one embodiment, the node gain is computed from the averages of a set of five Rx and Tx OCM 12,22 measurements for each channel. Alternatively, the Rx and Tx OCM 12,22 measurements could be synchronized, eliminating the need for averaging.

Assuming an average of five OCM 12,22 sample periods, the CNG loop will re-compute the OA 14,18 gain, channel and channel group VOA 16 settings every 10 ms. During each iteration of the CNG loop, each measured channel node gain is compared with its respective current target node gain, error values are computed for each channel and the OA 14,18 gain and VOA 16 attenuation settings are adjusted accordingly.

There are a number of boundary conditions in which this loop must operate which impact how the algorithms is designed. First, WSS VOA 16 attenuation setting is limited to 0-8 dB (measured from insertion loss at 0 dB attenuation setting). The 8 dB limit is present to avoid significant sidelobes in channel passband that is typically associated with microelectromechanical systems (MEMS)-based wavelength selective switches (WSSs) typically used in ROADMs. Additionally, OA 14,18 gain range limitations and noise figure (NF) implications, OA 14,18 output power limitation, and non-linear limitations on the channel power launched into a dispersion compensation module (DCM) at mid-stage of the OA 14,18 must also be considered.

In order to maximize system performance and minimize the NF each channel experiences through the OA 14,18 amplifier, the loop attempts to maximize the OA 14,18 gain which has the effect of minimizing the effective NF. Typically, the result of maximizing the OA 14,18 gain will have the effect of increasing the channel VOA 16 attenuation levels. However, the limited OA 14,18 gain, OA 14,18 output power, the limited channel attenuation or the limited amount of power that can be launched into a DCM module located at the mid-stage of the OA 14,18 (if present) will provide a limit to how high the gain of the OA 14,18 can be increased.

In general, with each iteration through the loop, a new desired VOA 16 attenuation level for each channel or channel group will be computed by summing the previous attenuation setting and the node gain error. Depending on the current situation, these new desired levels may exceed the acceptable attenuation range of the VOA 16. If this is the case, the gain of the OA 14,18 is adjusted by an amount equal to the difference between the upper limit of the VOA 16 and the value of the maximum VOA 16 level. If this change to the OA 14,18 gain is available and does not violate its gain or output power limitations, the result is to bring the maximum desired VOA 16 attenuation level to the maximum allowed value, thereby maximizing the gain of the OA 14,18.

Once the desired change in the OA 14,18 gain is computed, the VOA 16 requests the new gain setting to the OA 14,18. The OA 14,18 determines if this new setting is possible based upon its module type (gain range), current input power (max output power) and maximum input power (max power that may be launched into the DCM) and responds back to the VOA 16 what its new gain setting will be. The VOA 16, after receiving the new gain setting, adjusts all the desired attenuation setting levels accordingly, forcing those values that are out of the attenuation range to the closest value within the range, and submits those values to the VOAs 16.

For ROADM degrees, a characteristic of this algorithm is the behavior that with the condition that there is a spread of desired WSS channel VOA 16 attenuation settings that exceed the 8 dB effective dynamic range of the WSS attenuation levels (for express channels) or the maximum attenuation available within the respective OADM module, the performance of the lower power channels will be sacrificed in favor of the performance of the channels with higher powers. This occurs as the gain of the OA 14,18 is adjusted so as to make the WSS channel or OADM VOA 16 attenuation equal to its respective maximum. Channels or a group of channels that have calculated negative desired channel attenuation levels may not become positive and the attenuation level will be adjusted up to zero. This results in a condition that the target gain for these channels or group of channels is not achieved. The rational behind this is that the typical failure mode for channel power is a decreasing channel power rather than an increasing power and limiting the highest channel power prevents receiver overload of a locally dropped channel. However, if one or more channels dramatically increase their channel powers outside the design intentions, this event may compromise the performance of other channels which are otherwise operating normally. Note that the creation of such a high channel power condition would require a failure elsewhere in the network and such a condition would typically result in a similar type performance impact in a current manually padded, constant gain system as optical amplifier output power saturation decreases the overall gain. The resolution to such a situation would be the manual shut down of the offending high power channels.

Figure 1:
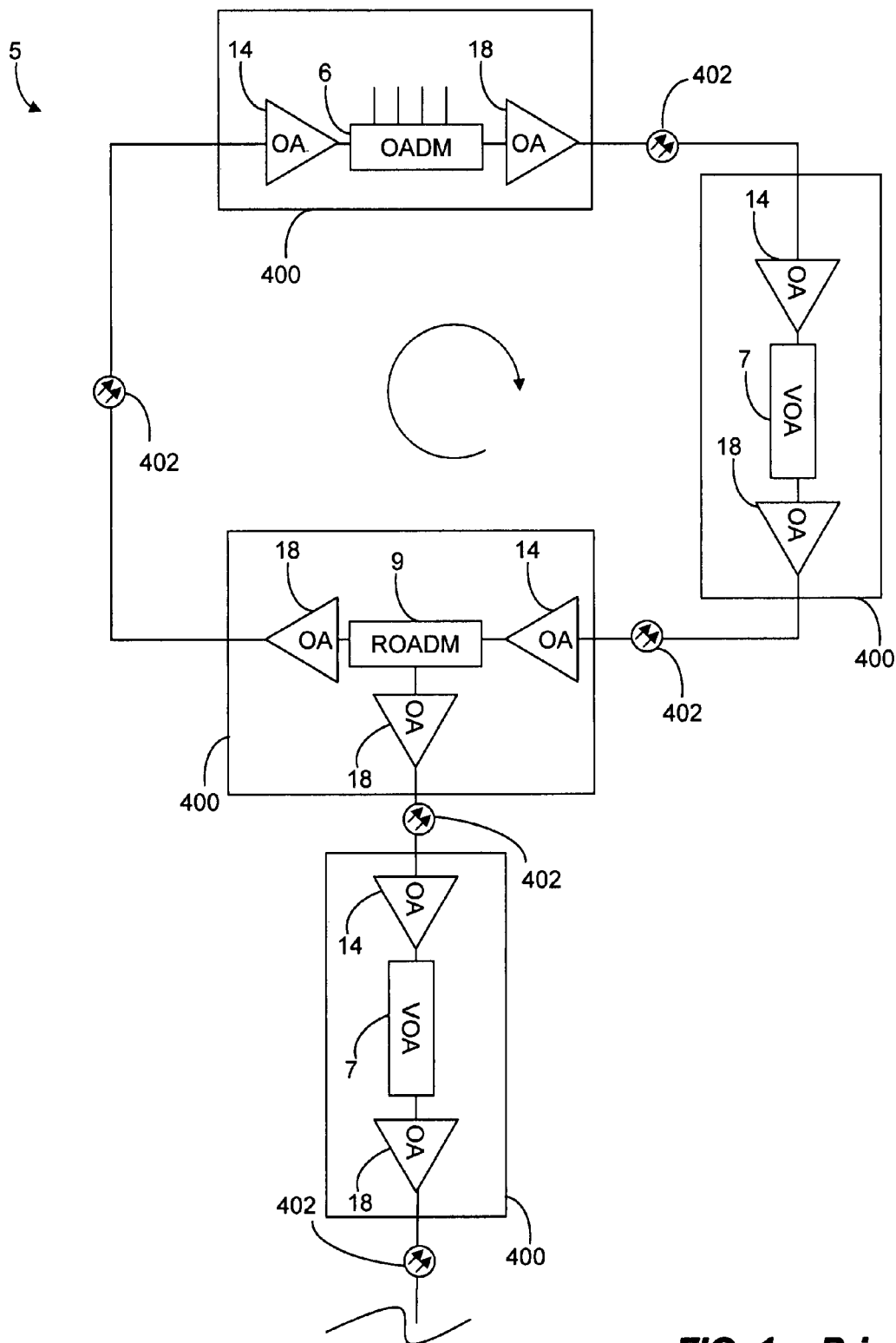
FIG. 1 illustrates an exemplary fiber-optic network.

A quantitative description of an exemplary implementation of the CNG control loop is illustrated in steps 30 through 58 in FIG. 1. The result of the CNG loop is an updated attenuation setting for all VOAs 16 for all N channels provisioned as expressed or dropped (within that degree). At the initiation of each CNG loop iteration, indexed as i, the current OA 14, 18 gain is known and given by $G^{OA}_{i-1}$, and the VOA 16 attenuation setting for each expressed channel (denoted as N) is also known and given by $A^{N}_{i-1}$. These values are known as the result of the completion of the previous CNG loop iteration (denoted as i−1).

$PI^N$ equals the measured channel power of the $N^{th}$ channel by the RX OCM 12 module, and this is updated every 2 ms (step 30). $PO^N$ equals the measured channel power of the $N^{th}$ channel by the TX OCM module 22, and this is updated every 2 ms and offset by the RX OCM 12 measurement by 1 ms (step 38). For indexing the loops, i represents the CNG and COP loop index where i equals an integer, and j represents the OCM 12,22 measurement index where j equals an integer.

Following the initiation of the CNG loop iteration i, an average channel power measurement is computed for all channels in both the RX and TX directions, respectively denoted as $PI^N_{A,i}$ and $PO^N_{A,i}$ and are represented in units of dBm. These averages are computed from several reported measured channel power values, such as five, reported from the RX and TX OCMs 12,22 for each respective channel. Note that these averages are averages of dBm values so as to summarize the impact of greater or lesser outlying single values on the average. In one embodiment, $PI^N_{A,i}$ and $PO^N_{A,i}$, respectively, are calculated as follows:

$$PI^N_{A,i} = \frac{1}{5}\sum_{j}^{j+5} PI^N_j \qquad \text{(Step 32)}$$

$$PO^N_{A,i} = \frac{1}{5}\sum_{j}^{j+5} PO^N_j \qquad \text{(Step 36)}$$

For all channels entering a node, each $PI^N_{A,i}$ value for each channel is obtained from the same RX OCM 12. However, the $PO^N_{A,i}$ values are sourced from the TX OCM 22 for the respective degree to which that particular channel is leaving the node. Note, FIG. 1 illustrates a two-degree configuration, but those of ordinary skill in the art will recognize additional OAs 18 could be included to form a multi-degree node.

For all channels and independent of their respective provisioned status, $PI_{A,i}^N$ and $PO_{A,i}^N$ values are computed. However, for the purposes of the CNG loop, the $PO_{A,i}^N$ value for those channels which are dropped at the degree node and similarly, a $PI_{A,i}^N$ for each channel which is added at the degree, are not utilized. For those wavelength channels which are not provisioned through the degree, neither $PI_{A,i}^N$ nor $PO_{A,i}^N$ values are utilized.

For those channels which are expressed through the node, the node gain for each channel, $G_i^N$, is computed and computed with the current node gain target for each channel to determine the current measured error in the channel node gain, $\Delta G_i^N$.

$$G_i^N = PO_{A,i}^N - PI_{A,i}^N \quad \text{(step 34)}$$

Next, a preliminary VOA 16 channel attenuation setting for each expressed channel based upon the computed needed change in the node gain is computed according to the formula:

$$A'^N_i = A^N_{i-1} - \Delta G_i^N \quad \text{(step 44)}$$

Depending upon the situation, the values for $A'^N_i$ can be positive or negative and may or may not be within the limited range of the VOA 16 attenuation setting for expressed channels. For the initial attenuation of channel N, a value of $A^N_{i=0}$ is set at 8 dB (step 40). Using $G_i^N$ and the current node gain target for each channel $GT_i^N$, the current measured error in the channel node gain, $\Delta G_i^N$, is computed (step 44). Also, a preliminary channel attenuation setting for channel N, $A'^N_i$, is computed (step 44) from the implemented channel attenuation setting for channel N in the previous loop iteration, $A^N_i$, and $\Delta G_i^N$. $\Delta G_i^N$ is proportional to the difference between $GT_i^N$ and $G_i^N$. In one embodiment, $\Delta G_i^N$ is computed as the difference between $GT_i^N$ and G.

$$\Delta G^N \propto GT^N - G^N \quad \text{(step 44)}$$

At the initiation of each iteration of the CNG loop, indexed as i, the current OA 14,18 gain is known and given by $G^{OA}_{i-1}$, and the VOA 16 attenuation setting for each dropped channel (denoted as N) is also known and given by $A^N_{i-1}$. Also, $G^{OA}_{i=0}$ is set to an initial amplifier gain value, such as 3 dB (step 50). These values are known as the result of completion of the previous CNG loop iteration (denoted as i−1) or as the initial conditions.

The next step is to adjust the gain of the OA 14,18 so that all the VOA 16 channel attenuation settings are within their respective allowable ranges. In accord with the operating goal of maximizing the gain of the OA 14,18 (for improved link performance through decreased OSNR degradation), the attenuation settings are maximized.

If any of the preliminary attenuation settings ($A'^N_i$) for those channels is greater than their respective limit, the gain of the OA 14,18 is reduced by the maximum amount of those excesses (step 54). Similarly, if the maximum preliminary attenuation settings ($A'^N_i$) for those channels is below the respective attenuation maximum, then the OA 14,18 gain will be increased (step 54). Note, the attenuation settings, $A'^N_i$, are also included for channels which are dropped locally. Therefore, the desired change in the gain of the OAV is given by $GI_i$.

$$GI_i^{OA} = \max\{-\Delta G_{OA\_max}, \min\{\Delta G_{OA\_max}, \min\{[A_{max}^N - A'^N_i]_{allN}\}\}\} \quad \text{(step 46)}$$

where $A_{max}^N$ is the maximum VOA 16 channel attenuation setting for each respective channel, N, and $\Delta G_{OA\_max}$ is the maximum allowed OA gain change per CNG loop iteration. Note that $GI^{OA}_i$ may be negative representing a gain decrease. The purpose to limit the maximum allowed OA gain change per CNG loop iteration is to minimize the impact of large transients which may occur as the OA gain and VOA 16 channel attenuation change occur sequentially and not simultaneously.

The requested gain increase is then sent to the OA 14,18 which determines how much of this requested increase (or decrease) can be implemented (step 54). This decision is based upon the OA 14,18 module type and the current operating conditions. The OA 14,18 then responds to the VOAs 16 with the gain setting that it has implemented as a result if the gain increase request. The implemented gain setting is denoted $G^{OA}_i$ (step 56). Note that $G^{OA}_i$ is the actual gain magnitude and not an incremental amount (such as $GI^{OA}_i$).

After receiving the amount by which the OA 14,18 has adjusted its gain, the preliminary VOA 16 channel attenuation settings ($A'^N_i$) are correspondingly adjusted to produce the final VOA 16 channel attenuation settings ($A^N_i$) for the CNG loop iteration i. $A^N_i$ is computed according to the equation:

$$A_i^N = \max\{0, A'^N_i - (G^{OA}_{i-1} - G^{OA}_i)\} \quad \text{(step 48)}$$

where the max function ensures that $A^N_i$ is not negative. These attenuation settings are then transmitted to the VOA 16 for implementation (step 58).

The VOA 16 channel attenuation settings ($A^N_i$) for all channels which are not provisioned to be either expressed through the node or dropped locally are set to their maximum values for all VOA 16 ROADM ports (i.e. channel is routed to a null port).

Any channel that is properly provisioned to be either expressed through the node or locally dropped, but currently has a loss-of-signal (LOS) status at the input to the node will have it's respective channel attenuation setting ($A^N_i$) set to the maximum value without rerouting the channel from the provisioned port (slow re-provisioning of channel back to provisioned port from the null port within a ROADM may require multiple seconds per node and an extensive total time to recover link). When the LOS status clears, control of the VOA 16 channel attenuation will be released to the power control loops which should naturally gradually increase the channel's output power.

The Constant Output Power (COP) loop (steps 60 through 70) functions as an outer loop to the CNG loop. Its general purpose is to compare the measured node output channel power to a stored target output channel power target for each expressed and added channel and subsequently make the proper corrections to the target node gain with the goal of bringing the measured output channel power equal to each channel's respective output channel power target.

Figure 3:
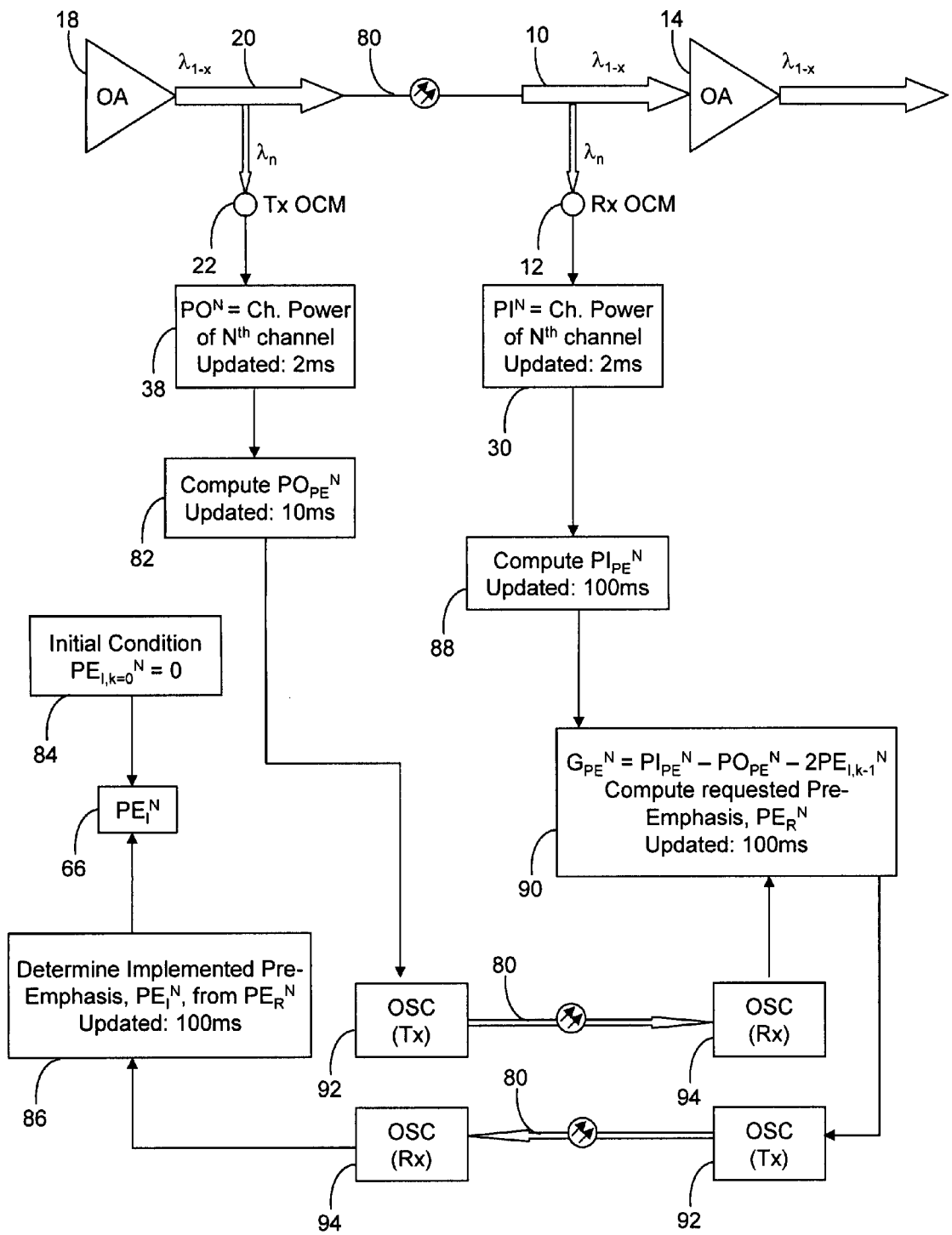
FIG. 3 illustrates an upstream node with a node along with a flowchart depicting an exemplary embodiment of a pre-emphasis control loop.

At the initiation of each COP loop iteration, indexed as i and operating concurrently with the CNG loop, the current channel output power target is given by $PT_i^N$. The value of $PT_i^N$ for each channel is provisionable by a user, $PT_{prov}^N$, (step 62). Also, the $PT_i^N$ can also be affected by a Pre-Emphasis (PE) control loop, $PE_i^N$, (step 66). The purpose of the Pre-Emphasis (PE) control loop is to enable the system to detect a relative imbalance in the channel powers entering a node resulting from a channel dependent gain/loss performance between channels and implement complementary channel power level adjustments, based on that imbalance, at the output(s) of the respective upstream node(s) so as to minimize the degrading impact of the channel dependence. The PE loop is not required with the CNG and COP loop, but can be used to improve pre-emphasis of each channel. An exemplary embodiment of the PE loop for calculating $PE_1^N$ is depicted in FIG. 3. The $PT_i^N$ value for each channel is computed by:

$$PT^N = PT_{prov}^N + PE_1^N \qquad \text{(step 66)}$$

For expressed channels, the gain target for the CNG loop is then altered by the difference between the currently measured (and averaged) output channel power, $PO_{A\ i}^N$, and the current output channel power target, $PT_i^N$ to provide an updated channel node gain target for the CNG loop index i.

For each added or expressed channel, denoted as N, the difference between the currently measured (and averaged) output channel power, $PO_{A\ i}^N$, is compared with the current output channel power target, $PT_i^N$ and is given by $$GT_i^N = GT_{i-1}^N + PT_N - PO_A^N \qquad \text{(step 68)}$$

The calculation of $GT_i^N$ is carried out prior to that of $\Delta G_i^N$ within each loop index i providing the target gain for channel N (step 70) to compare with the measured gain of channel N in step 44.

Advantageously, these optical control loops are the vehicle for channel turn-up and turn-down, allowing easier and faster changes. These loops enable change to network configurations rapidly through point-and-click provisioning through an element management system (EMS), network management system (NMS), craft interface, and the like. Further, because of the inherent unpredictability, in a reconfigurable mesh network, of amplifier channel-loading and the consequent need to react to changes in amplifier spectral gain shape (i.e. channel-dependent ripple), these control loops improve link-budget margin.

Referring to FIG. 3, an exemplary embodiment of a Pre-Emphasis (PE) control loop (steps 82 through 90) which can be used with the COP and CNG control loops is illustrated. The PE control loop enables the system to detect a relative imbalance in the channel powers entering a node resulting from a channel dependent gain/loss performance between channels and implement complementary channel power level adjustments, based on that imbalance, at the output(s) of the respective upstream node(s) so as to minimize the degrading impact of the channel dependence. The loop performs this function by determining the relative gain/loss imbalances and determining corrective pre-emphasis magnitudes for each channel. A request is then sent upstream (via an OSC 92,94 network) with an amount by which each channel's power should be increased or decreased, or pre-emphasized. As that message travels upstream, the first node which can properly affect the independent channel power levels receives, terminates and acts on that message. Those nodes which cannot independently affect the channel power levels, forwards this message upstream unaltered. Within the node which terminates the message, the requested output power change for each channel is forwarded to the respective VOA 16 module within the node operating the CNG and COP loop for each channel. The COP loop then alters the provisioned constant output channel power target by the requested pre-emphasis amount. Steps 82 through 90 provide a block diagram illustration of the structure of the PE control loop algorithm.

Several general aspects of the PE control loop are important to its operation. First, the goal of the PE loop is not to equalize the relative channel powers at the input 10 to the node as this would overly impair channels with excess gain while potentially launching channels with lesser amounts of gain at potentially excessive channel powers. In general, the goal is to implement a level of pre-emphasis such that the imbalance is equivalent in overall magnitude at both the output 20 of the upstream node and the input to the downstream node.

Second, the effect of the power level modifications implemented by the PE loop is not to alter the total aggregated optical power as this might cause the total output power from an amplifier 14,18 to be exceeded. If the power control system is functioning properly, corrections to the total aggregated upstream node output power level, as well compensation for prior span loss, should be properly implemented through the respective COP control loops.

Third, the amount by which the PE loop can alter the upstream node output launch power is limited so that the nonlinear power thresholds are not approached and channels which initially are grossly underpowered (due to earlier upstream faults or failures) or receive significantly less net gain than designed, do not draw down healthy channels.

Forth, once the respective node output power targets have been adjusted to the extent possible according to the amounts requested by the down-stream PE control loop, the node must construct a message containing the actual amounts by which the output channel powers of each channel have been modified. The reason for doing this is to avoid the ambiguity, from the perspective of the PE control loop, as to why the power level of a given channel has not changed by the amount previously requested by the PE loop. This could be due to either a limitation in the available channel output power at the upstream node or a change in the total gain/loss for that channel which occurred after the pre-emphasis adjustment amounts were previously requested.

The PE control loop utilizes the power readings from the RX and TX OCM 12,22 including readings from upstream nodes. In an exemplary embodiment, upstream OCM 12,22 readings are provided through an optical service channel (OSC) 92,94 network. The OSC 92,94 can include an out-of-band wavelength, such as 1510 nm or 1625 nm, which provides a dedicated communication channel for optical nodes to provide operations, administration, maintenance, and provisioning (OAM&P) data. The OSC 92,94 is carried along with channel-carrying wavelengths over an optical fiber 80 between nodes.

The upstream node participating in the PE control loop transmits to the corresponding downstream node the amount of pre-emphasis it has implemented in the previous iteration through the loop ($PE_{1\ k-1}^N$) as well as the averaged measured output channel power as the average of the previous 100 values of the averaged TX OCM 22 channel power measurement ($PO_{A\ k}^N$) for the PE loop index k ($PO_{PE\ k}^N$).

$$PO_{PE,k}^N = \frac{1}{100} \sum_{i-100}^{i} PO_{A,i}^N \qquad \text{(step 82)}$$

The previous 100 values of the averaged RX OCM 12 channel power measurement ($PI_{A\ i}^N$) are averaged to give the current value for $PI_{PE\ k}^N$.

$$PI_{PE,k}^N = \frac{1}{100} \sum_{i-100}^{i} PI_{A,i}^N \qquad \text{(step 88)}$$

For each (healthy) channel, a normalized gain between the upstream node output and the node input ($G_{PE\ k}^N$) is computed by subtracting the averaged input and output powers and removing the known amount of pre-emphasis implemented.

$$G_{PE,k}^N = PI_{PE,k}^N - PO_{PE,k}^N - 2PE_{I,k-1}^N \quad \text{(step 90)}$$

For each (healthy) channel, a raw gain error ($\Delta G'^N_{PE\_k}$) is computed as the difference between the maximum value of $G_{PE\_k}^N$ across all (healthy) channels and the value for that respective channel.

$$\Delta G'^N_{PE,k} = (\max[G_{PE,k}^N]_{allN} - G_{PE,k}^N)$$

In order to avoid channels which suffer sever decreased gain relative to the surviving channels, the raw gain error for that channel is weighted based upon its magnitude according to a weighting function with $\Delta G_{PE\_max} = 2.5$ and $\Delta G_{PE\_thresh} = 3.0$. The resulting weighted channel gain error is given by $\Delta G_{PE\_k}^N$.

$$\Delta G_{PE,k}^N = \Delta G'^N_{PE,k} \text{ where } \Delta G'^N_{PE,k} \leq \Delta G_{PE\_thresh}$$

$$\Delta G_{PE,k}^N = \Delta G'^N_{PE,k}\left[1 - \frac{\Delta G'^N_{PE,k} - 2.5}{3.0 - 2.5}\right] \text{ where }$$

$$\Delta G_{PE\_thresh} < \Delta G'^N_{PE,k} < \Delta G_{PE\_max}$$

$$\Delta G_{PE,k}^N = 0 \text{ where } \Delta G'^N_{PE,k} \geq \Delta G_{PE\_max}$$

The average, computed in dB terms, of all $\Delta G_{PE\_k}^N$ values is then calculated to identify a mid-point to pre-emphasis all value towards. The amount of pre-emphasis to be requested for each (healthy) channel ($PE_{R\_k}^N$) is then half of the resulting deviations between the weighted channel gain values and the average.

$$PE_{R,k}^N = \frac{\Delta G_{PE,k}^N - \overline{\Delta G_{PE,k}^N}|_{healthy\_channels}}{2} \quad \text{(step 90)}$$

A channel is considered healthy if it satisfies the following condition.

$$\Delta G'^N_{PE,k} < \Delta G_{PE\_max}$$

All values of $PE_{R\_k}^N$ are then communicated upstream. For those channels not deemed healthy, an appropriate flag indicating this status should be substituted.

At each the upstream node, the requested pre-emphasis values are received and forwarded to the appropriate element (e.g., VOA 16, ROADM, etc.) which is operating the set of control loops for the respective channels. For each channel, the current provisioned or default value of the output power target ($PT_{prov\_i}^N$) is modified by the requested amount of pre-emphasis to produce the operating node output channel power target ($PT_i^N$). As a preliminary calculation, the output power channel target based upon the requested amount of PE is given by $$PT_i^N |_{preliminary} = PT_{prov,i}^N - PE_{R,k}^N \quad \text{(step 86)}$$

The following variables are utilized in the CNG, COP, and PE control loops:

| Variable | Description |
|---|---|
| N | Wavelength channel number (integer between 1 and X) |
| i | CNG and COP loop index (integer) |
| j | OCM measurement index (integer) |
| k | PE loop index (integer) |
| $PI^N$ | Rx OCM 12 channel power measurement for channel N |
| $PI_A^N$ | Averaged Rx OCM 12 channel power measurement for channel N |
| $PO^N$ | Tx OCM channel power measurement for channel N |
| $PO_A^N$ | Averaged Tx OCM channel power measurement for channel N |
| $G^N$ | Measured channel node gain for channel N |
| $\Delta G^N$ | Measured channel node gain error for channel N |
| $GT^N$ | Target node gain for channel N and CNG loop |
| $A'^N_i$ | Preliminary channel attenuation setting for channel N and CNG loop index i |
| $A^N_i$ | Implemented channel attenuation setting for channel N and CNG loop index i |
| $A_{max}^N$ | Maximum allowable VOA channel attenuation setting for expressed and dropped channel N |
| $GI^{OA}_i$ | Requested increase in OA gain for CNG loop index i |
| $PT^N_i$ | Node output channel power target for channel N and COP loop iteration index i |
| $GT^N_i$ | Target node gain for channel N and CNG loop index i |
| $PT_{prov\_i}^N$ | User provisioned or default value of the node output channel power target for channel N and COP loop iteration index i |
| $PE_{I\_k}^N$ | Implemented Pre-Emphasis magnitude for channel N and PE control loop index k (positive values represent increases in output powers) |
| $PO_{PE\_k}^N$ | Averaged (upstream) Tx OCM channel power measurement for channel N and PE loop index k |
| $G_{PE\_k}^N$ | Measured channel gain between the upstream node output and the node input for channel N and PE loop index k |
| $PE_{R\_k}^N$ | Requested Pre-Emphasis magnitude for channel N and PE control loop index k (positive values represent increases in output powers) |

Figure 4:
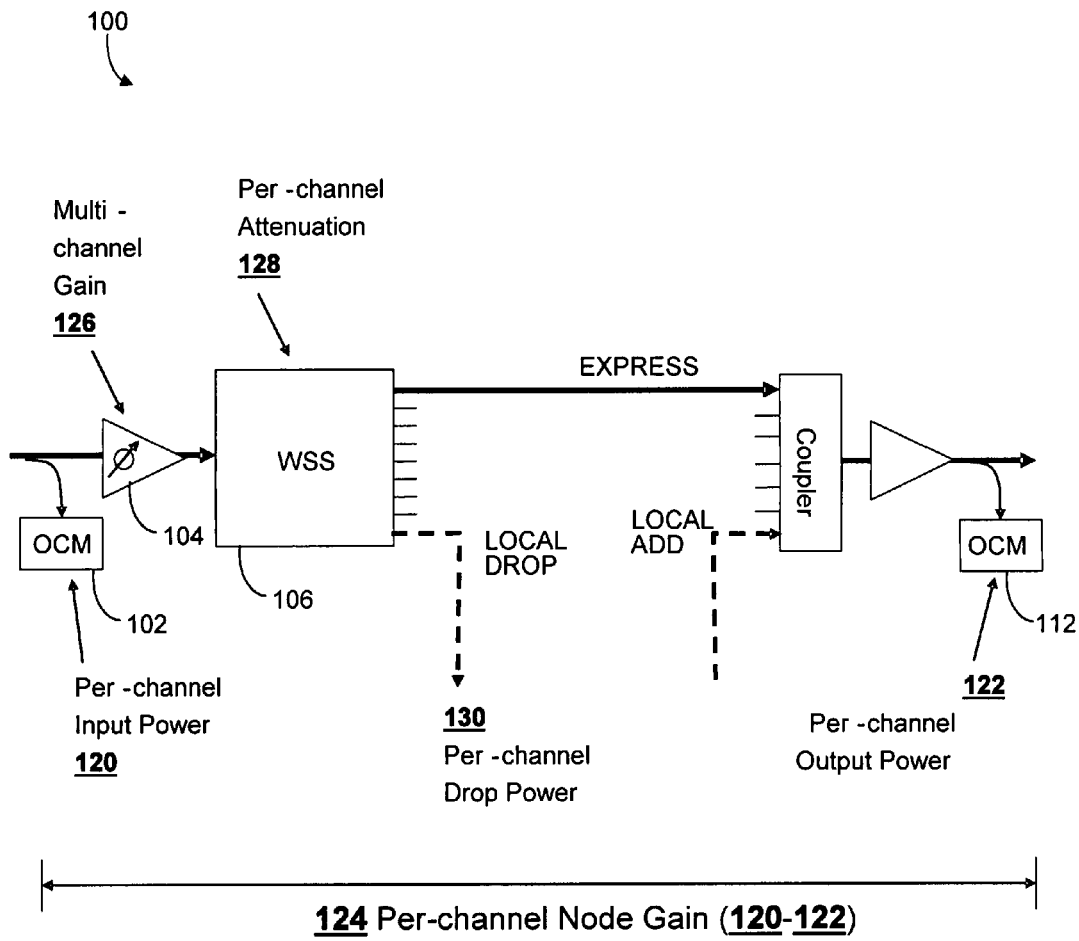
FIG. 4 illustrates a block diagram of a node illustrating power, gain, and attenuation.

Referring to FIG. 4, a block diagram of a node 80 illustrates an exemplary embodiment of the present invention to utilize nested control loops to stabilize node gain. The present invention utilizes two nested control loops: a node gain loop, maintaining constant relative difference between a channel power 120 at the node input and a channel power 122 node output, and a constant output power loop, maintaining constant launch power 122 out of the node degree. Further, the present invention can utilized a third control loop to control channel power pre-emphasis (PE), enabling better OSNR and longer reach through pre-compensation of the launch power for system power ripple (spectral dependence).

The constant output power loop fulfills channel power setting or equalization requirements. However, constant output power loop, running on multiple nodes in series, will over-react to upstream transients and cause system oscillations unless a faster node gain loop is used to keep nodes insulated from external events. The constant output power loop sets the node gain loop per-channel-node-gain targets, and effects output power targets via the node gain loop.

The node gain loop maintains constant relative difference (in dB) between the channel power at the node input 120 and the node output 122. This ensures that internal changes within the node will also be corrected at the same node. The node gain loop utilizes the OCMs 102,112 to monitor per-channel power at the input and output, and utilizes an average reading over time to measure node gain for each channel. This measured node gain is compared to a target node gain for each channel (which is set by the constant output power loop). Accordingly, per-channel attenuation 128 and multi-channel gain 126 are adjusted responsive to the measured node gain comparison to the target node gain. Also, the node gain loop can control constant optical power 130 delivered to the local-drop data-cards.

The constant output power loop brings the node output power 122 (launch power) to a target value by setting the node gain targets for express channels and add-drop channel attenuation. A pre-emphasis loop can change the constant output loop targets to ensure equal OSNR performance over a link. The pre-emphasis loop is optional.

Figure 5A:
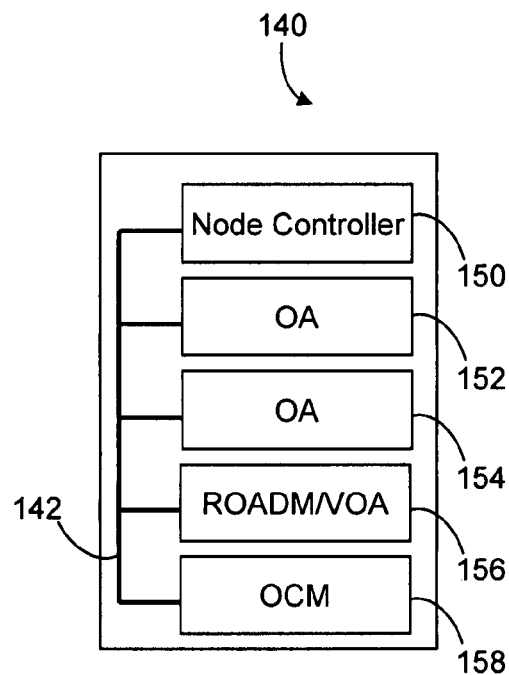
FIGS. 5a-5b illustrate block diagrams of exemplary embodiments of nodal configurations including components configured to perform the control loops of the present invention.
Figure 5B:
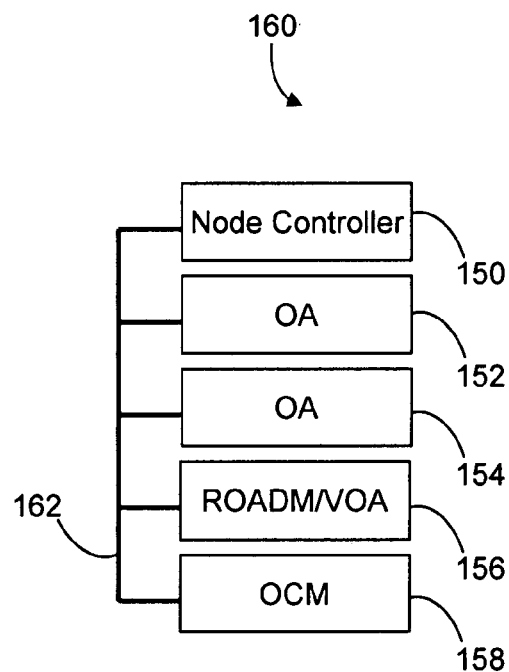

Referring to FIGS. 5*a*-5*b*, exemplary node configurations 140,160 illustrates the optical components for performing the adaptive gain control loops of the present invention. The components required to perform optical amplification, add-drop, and the control loops of the present invention generally include a node controller 150, optical amplifiers (OAs) 152, 154, a ROADM/VOA 156, and an OCM 158. In node 140, the components (150,152,154,156,158) are in communication through a backplane 142. For example in node 140, the components (150,152,154,156,158) can be individual circuit packs which are installed in a shelf which includes the backplane 142. In node 160, the components (150,152,154,156, 158) are in communication through a network connection 162, such as Ethernet. For example in node 160, the components (150,152,154,156,158) can be stand-alone modules which communicate through the network connection 162.

The node controller 150 provides a single contact point for the node for an element management system (EMS), network management system (NMS), and the like. Additionally, the controller 150 is operable to perform nodal control functions, such as operating the nested control loops of the present invention. The OAs 152,154 are configured to provide pre and post amplification. Also, the nodes 140,160 can include multiple OAs 152,154 as are required for additional degrees at a ROADM node. The node controller 150 is configured to operate multiple degrees, and to operate the nested control loops on these multiple degrees. The ROADM/VOA 156 is included at a mid-stage point optically between the OAs 152,154, and is configured to perform attenuation per-channel or per groups of channels. Additionally, the ROADM can provide reconfigurable add-drop of wavelengths. Finally, the OCM 158 is configured to perform optical channel monitoring on the transmit and receive side per channel as required by the nested control loops.

Referring to FIGS. 6-9, a flowchart implementing the nested control loops is illustrated in an exemplary embodiment of the present invention. As described herein, the nested control loop operates between components such as OAs, OCMs, ROADMs, OADMs, and the like. The flowchart illustrated in FIGS. 6-9 can be implement in a digital signal processor (DSP), microprocessor, or the like contained in one or more of the components, and in communication with the other components.

The flowchart starts and keeps a loop count which is incremented after each iteration through the loop (step 200). If the control loops are disabled or on hold (step 201), then the loop terminates back at step 200. Next, the flowchart checks to see if it is time to run a constant output power (COP) loop 210 (step 202). The COP loop 210 calculates target gain for the node based on the differences between the current powers of the express channels and the target powers of the express channels. The COP loop 210 is run periodically, such as every $5^{th}$ or $10^{th}$ iteration of the loop count. The output of the COP loop 210 is an updated target node gain which is utilized in an inner, faster loop for channel node gain (CNG).

Figure 7:
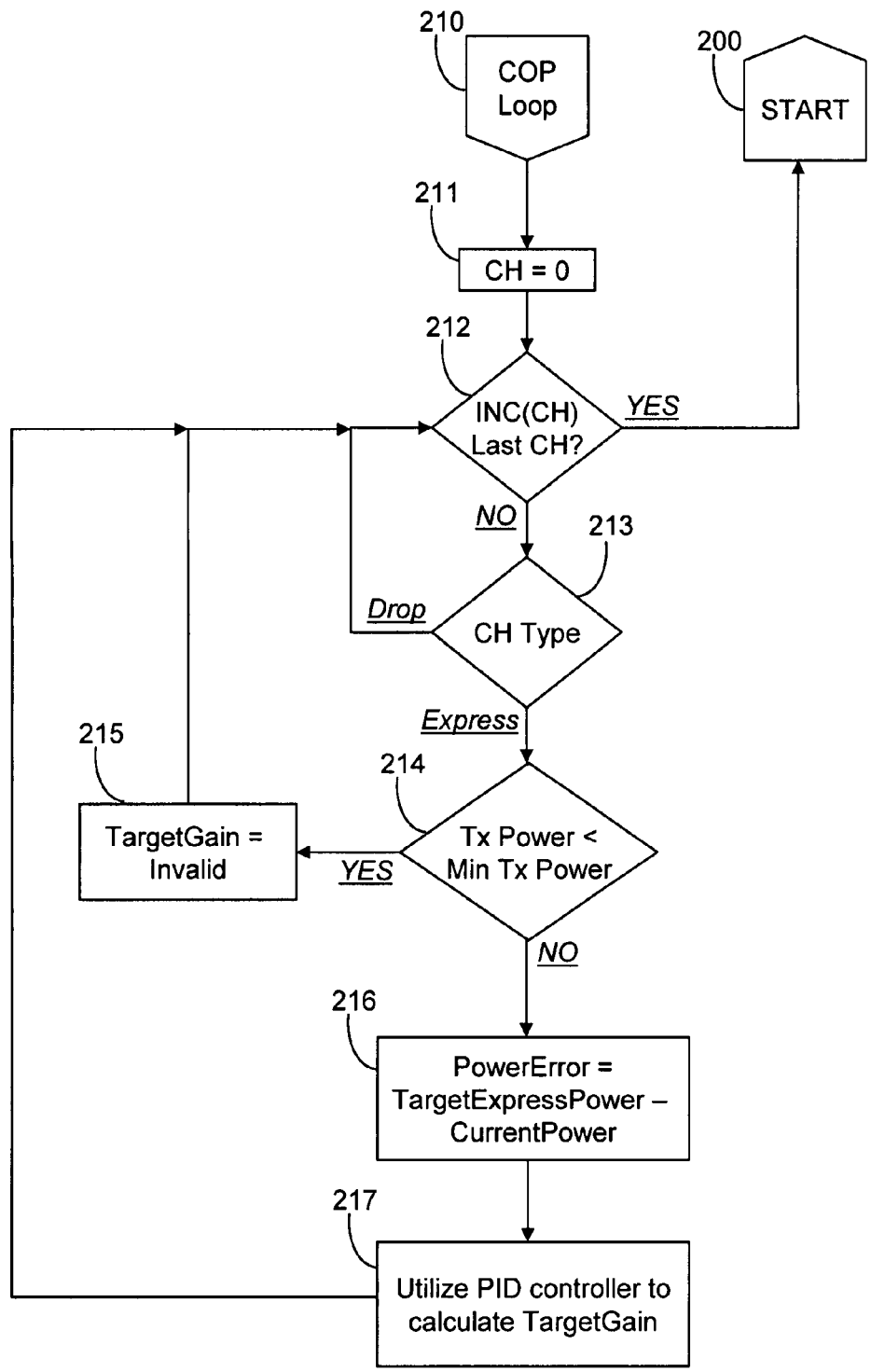

FIG. 7 illustrates the COP loop 210. First, a channel count is initialized at 0 (step 211). Next, the channel count is incremented and checked to see if the channel count equals the last channel (step 212). If the channel count equals the last channel, then the COP loop 210 is complete and it goes back to step 200. Next, the channel type of the channel number equal to the channel count is checked (step 213). If the channel type is a dropped channel, then this is ignored by the COP loop and the loop returns to step 212. If the channel is express, then the TX power of this channel is compared to a minimum TX power (step 214). If it is less than the minimum TX power, then the TargetGain for that channel is invalid (step 215), and the COP loop returns to step 212. If not, then PowerError is calculated for this channel as the difference between a TargetExpressPower from the CurrentPower (i.e., result of a power measurement in step 231).

A proportional-integral-derivative (PID) controller is utilized to calculate the TargetGain (step 217). A PID controller is a common feedback loop component in control systems. The controller takes a measured value from a process or other apparatus and compares it with a reference target value. The difference (or "error" signal) is then used to adjust some input to the process in order to bring the process' measured value to its desired target. Unlike simpler controllers, the PID can adjust process outputs based on the history and rate of change of the error signal, which gives more accurate and stable control. The TargetGain is calculated as the sum of the $P_{contrib}$, $I_{contrib}$, and $D_{contrib}$ terms from the PID algorithm. These terms are calculated based upon the PowerError from each express channel, and different fixed gain constants. Once the COP loop increments through all channels, the TargetGain is calculated from the PID controller, and this is passed back to the CNG loop.

Figure 6:
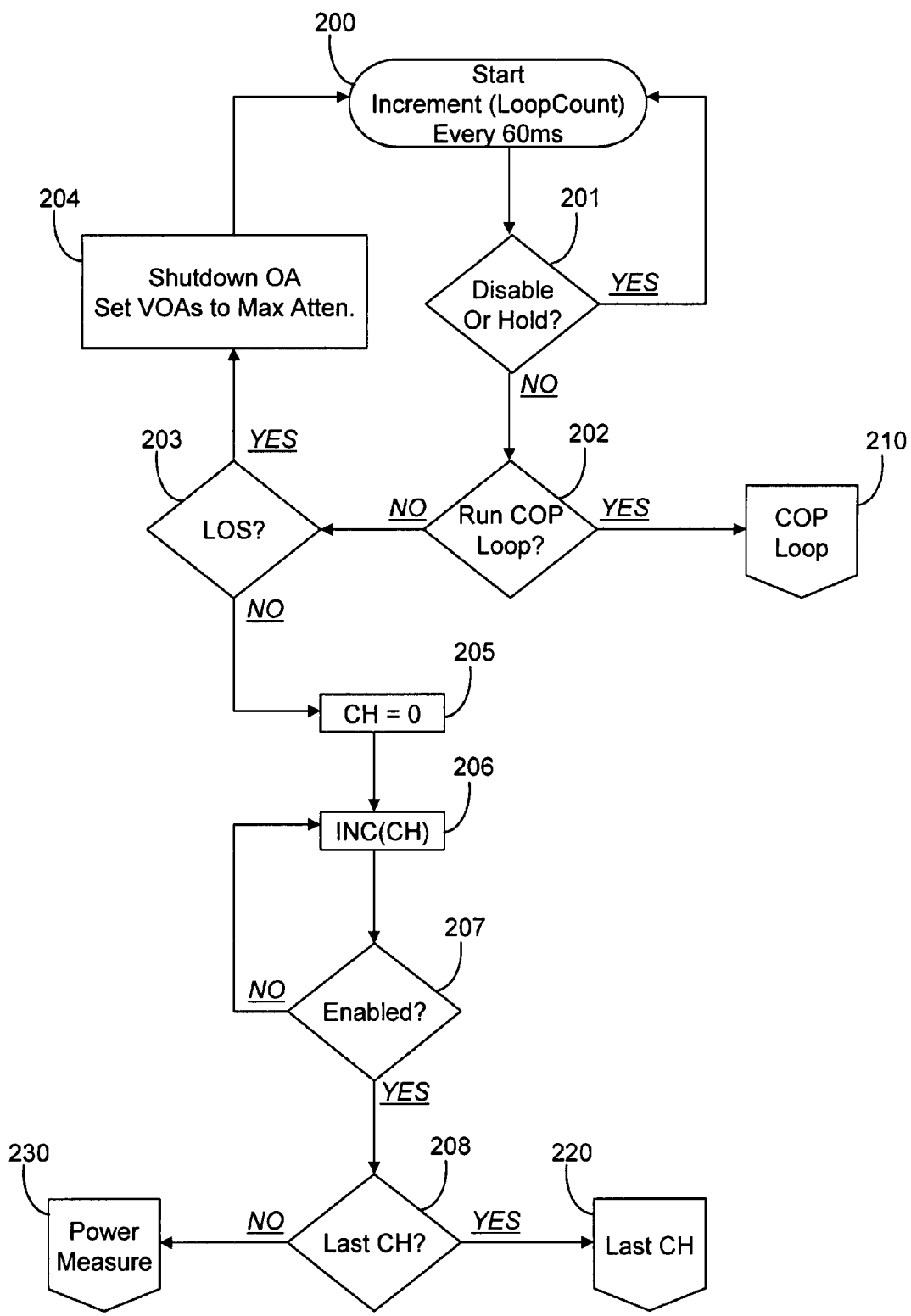
FIGS. 6-9 illustrate flowcharts of an exemplary embodiment of an implementation of the nested control loops of the present invention.

Back in FIG. 6, if the COP loop is not run in step 202, then the loop checks to see if there is a loss-of-signal (LOS) condition (step 203). If the node has LOS, then the OAs are shutdown and VOAs are set to maximum attenuation (step 204), and the loop returns to step 200. If no LOS, then the CNG loop begins by setting a channel count increment to 0 (step 206). Next, the channel count is incremented (step 206). The channel is checked to see if it is enabled at the node (step 207), and if not, then the loop goes to step 206. If so, the loop checks to see if it is the last channel (step 208). If it is not the last channel, then the CNG loop goes to power measurement (step 230), and if it is the last channel, then the CNG loop goes to a last channel flowchart (step 220).

Figure 8:
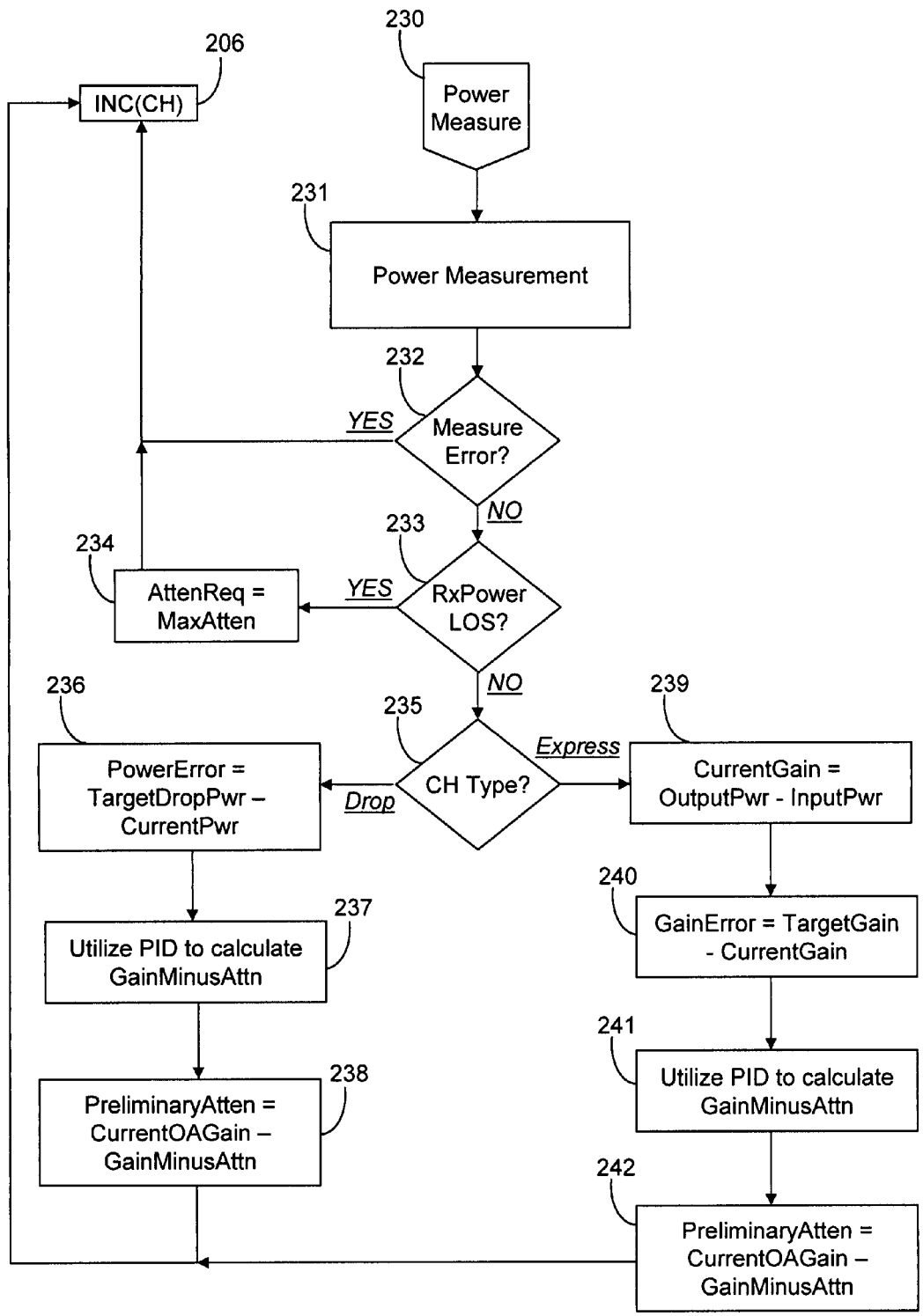

FIG. 8 illustrates the power measurement (step 230), error measurement, and attenuation setting portion of the CNG loop. The power is measured for each channel (step 231). This step is accomplished both at the channel input and output, and uses an OCM in one embodiment. Next, the CNG loop checks to see if there is a measurement error (step 232), and if so, it returns to step 206. If no error, the CNG loops checks to see if there is a LOS on the receive power (step 233), and if so, the attenuation setting request (AttenReq) is set to a maximum attenuation value (MaxAtten) for that channel, and the CNG loop returns to step 206. If no RX LOS, then the CNG loop checks for the channel type (step 235). The CNG loop operates on both express and drop channels at the node: for express channels, CNG is nested within and has it's target set by the COP loop; for drop channels, CNG runs as a single loop controlling to the drop power target.

If the channel is Express, then the Current power gain (CurrentGain) is computed as the difference between measured output and input power (step 239). Next, a gain error (GainError) is computed for that channel as the difference between TargetGain (from the COP loop) and current gain (step 240). A PID controller utilizes this gain error to calculate GainMinusAttenuation (GainMinusAttn). The GainMinusAttn is a value distributed between the OA and attenuation of the VOA which results in the maximum gain for the best OSNR. The GainMinusAttn value will be used to calculate VOA attenuation changes through the loop, and the value is dominated by the channel which generates the maximum excess preliminary attenuation during the PID calculation. The Preliminary attenuation of the channel is set equal to the current OA gain minus the GainMinusAttn value (step 242), and the CNG loops returns to step 206.

If the channel is Dropped, then the Power error is computed as the difference between a target drop power (TargetDropPwr) and the current measured or calculated channel power at the receiver (step 236). This TargetDropPwr can be a provisioned value, or set automatically from reading configuration data of the receiver requirements. It is not set by the COP loop. Next, the PID controller utilizes this gain error to calculate GainMinusAttenuation (GainMinusAttn) (step 237). The Preliminary attenuation of the channel is set equal to the current OA gain minus the GainMinusAttn value (step 238), and the CNG loops returns to step 206.

Figure 9:
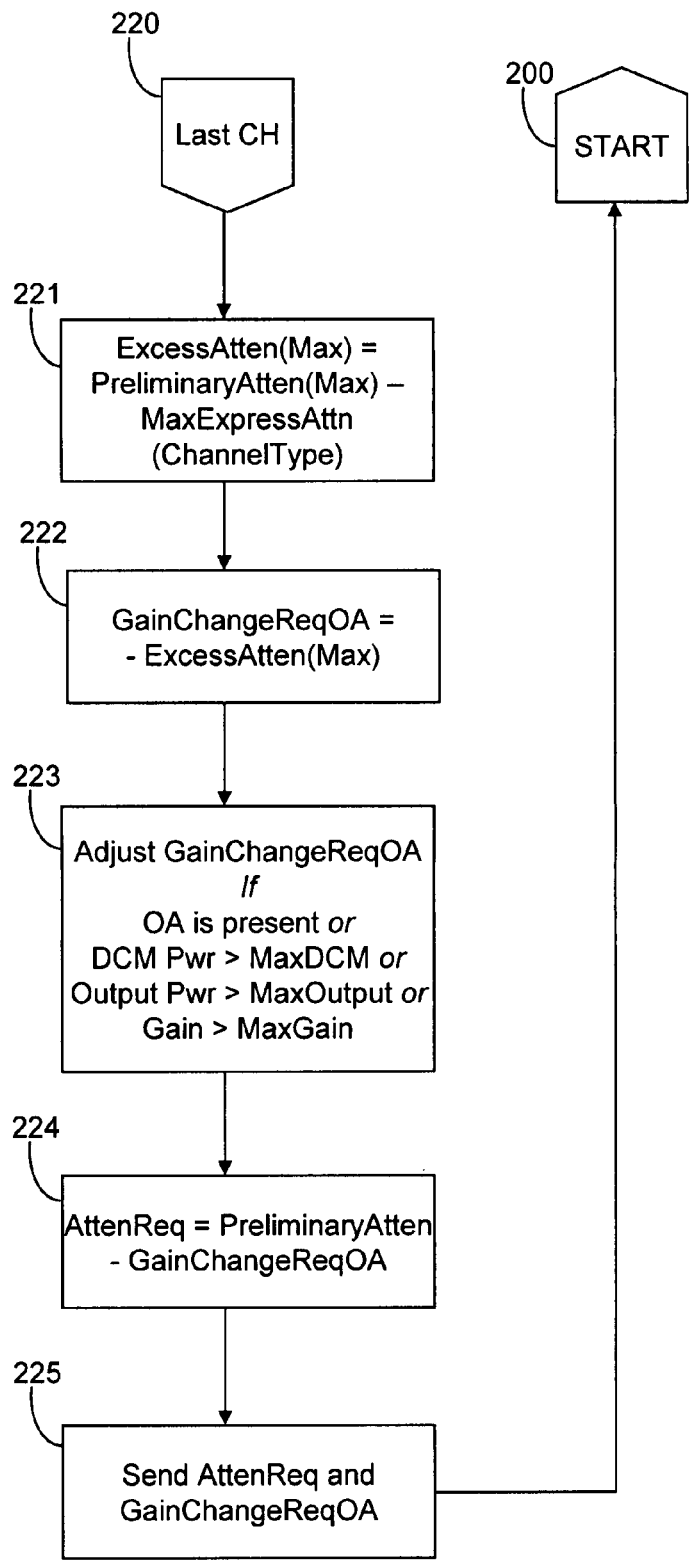

FIG. 9 illustrates the last channel steps 220 for the CNG loop. The maximum excess attenuation (ExcessAtten(Max)) is computed as the difference between the maximum preliminary attenuation (PreliminaryAtten(Max)) minus the maximum express attenuation for that channel type (MaxExpressAttn) (step 221). For example, the maximum express attenuation can be 8 dB for express channels and 15 dB for dropped channels. Next, the requested gain change for the OA (GainChangeReqOA) is calculated as minus ExcessAtten(Max) (step 222). This GainChangeReqOA may be required to be adjusted according if an OA is present, DCM power is above a maximum, output power is above a maximum, or gain is above a maximum (step 223). The attenuation request for each channels is computed as the preliminary attenuation for that channel minus the GainChangeReqOA value (step 224). Finally, the new attenuation settings and the new gain settings are sent to the various components (step 225), and the loop returns to step 200.

Figure 10:
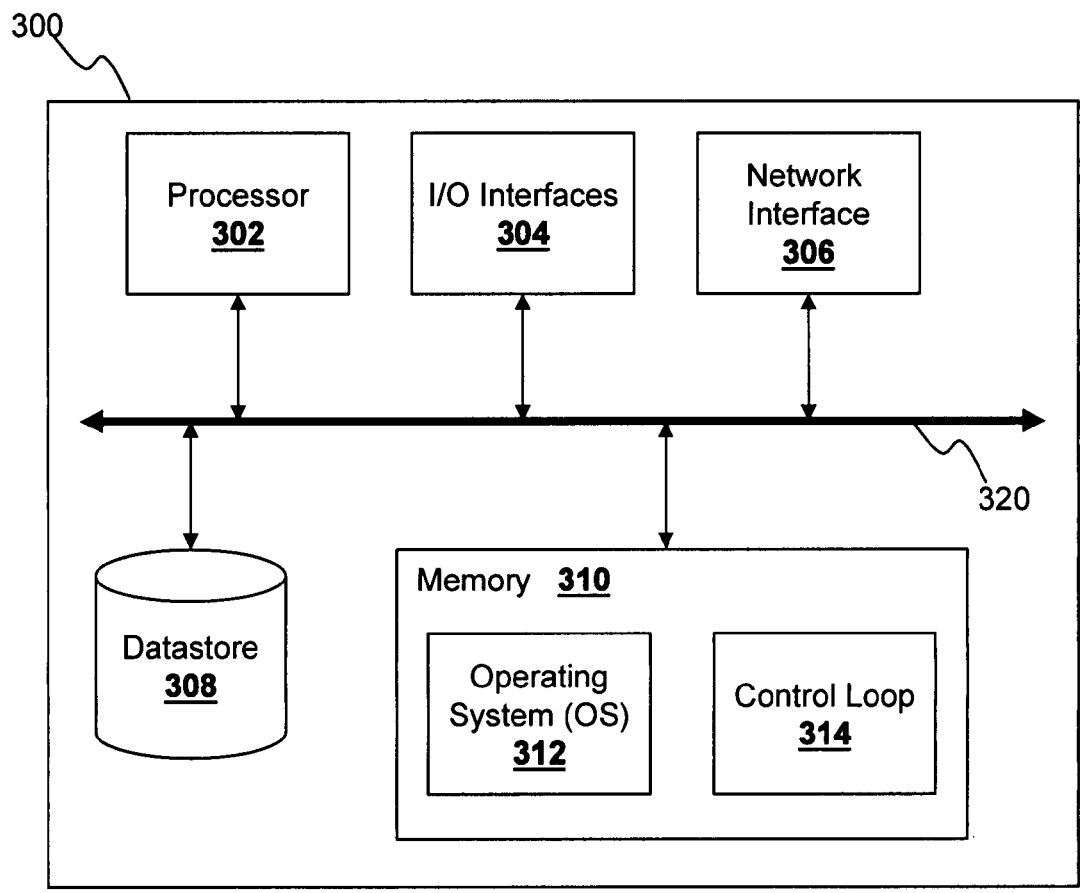
FIG. 10 illustrates a block diagram of an exemplary embodiment of a controller configured to perform the control loops of the present invention.

Referring to FIG. 10, a block diagram illustrates a controller 300 having a control loop 314 engine, according to an exemplary embodiment of the present invention. The controller 300 can be a digital computer that, in terms of hardware architecture, generally includes a processor 302, input/output (I/O) interfaces 304, network interfaces 306, memory 310, and a data store 308. In an exemplary embodiment, the controller 300 is located in a node controller communicatively coupled to optical amplifiers, OCMs, VOAs, ROADMs, etc. to perform the control loop 314 engine. In another exemplary embodiment, the controller 300 is located on each optical component (e.g., optical amplifiers, OCMs, VOAs, ROADMs) to perform the control loop 314 engine.

The components (302, 304, 306, 308, and 310) are communicatively coupled via a local interface 320. The local interface 320 can be, for example but not limited to, one or more buses or other wired or wireless connections, as is known in the art. The local interface 320 can have additional elements, which are omitted for simplicity, such as controllers, buffers (caches), drivers, repeaters, and receivers, among many others, to enable communications. Further, the local interface 320 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 302 is configured to execute software stored within the memory 310, to communicate data to and from the memory 310, and to generally control operations of the controller 300 pursuant to the software instructions.

The I/O interfaces 304 can be used to receive user input from and/or for providing system output to one or more devices or components. User input can be provided via, for example, a keyboard and/or a mouse. System output can be provided via a display device and a printer (not shown). I/O interfaces 304 can include, for example, a serial port, a parallel port, a small computer system interface (SCSI), an infrared (IR) interface, a radio frequency (RF) interface, and/or a universal serial bus (USB) interface.

The network interfaces 308 can be used to enable the controller 300 to communicate on a network. For example, the controller 300 can utilize the network interfaces 306 to communicate to optical components (e.g., optical amplifiers, OCMs, VOAs, ROADMs). Alternatively, the network interfaces 306 can communicate to the optical components over a backplane. The network interfaces 306 can include, for example, an Ethernet card (e.g., 10BaseT, Fast Ethernet, Gigabit Ethernet) or a wireless local area network (WLAN) card (e.g., 802.11a/b/g). The network interfaces 306 can include address, control, and/or data connections to enable appropriate communications on the network.

A data store 308 can be used to store data, such as information received from NEs. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the controller 300 such as, for example, an internal hard drive connected to the local interface 320 in the controller 300. Additionally in another embodiment, the data store can be located external to the controller 300 such as, for example, an external hard drive connected to the I/O interfaces 304 (e.g., SCSI or USB connection). Finally in a third embodiment, the data store may be connected to the controller 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 can have a distributed architecture, where various components are situated remotely from one another, but can be accessed by the processor 302.

The software in memory 310 can include one or more software programs, each of which includes an ordered listing of executable instructions for implementing logical functions. The software in the memory system 310 includes the control loop 314 engine and a suitable operating system (O/S) 312. The operating system 312 essentially controls the execution of other computer programs, such as the control loop 314 engine, and provides scheduling, input-output control, file and data management, memory management, and communication control and related services. The operating system 312 can be any of Texas Instrument's Basic Input-Output System (BIOS) (available from Texas Instruments of Dallas, Tex.), Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or any other real time operating system.

The control loop 314 engine is configured to perform the control loops described herein. The controller 300 is configured to communicate to multiple nodes, such as through the network interfaces 308. The controller 300 receives inputs from the OCMs, OAs, and VOA attenuation settings from devices such as ROADMs, OADMs, and the like. These inputs are used to operate the control loops to provide constant output power and a constant node gain target according to the descriptions provided herein.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A nested control loop method to stabilize an optical network against nodal gain changes, comprising:
   monitoring per channel power levels at a node input and node output;
   computing a per channel node gain based on the difference between output and input per channel power levels;
   computing a per channel target node gain, wherein the per channel target node gain comprises the difference between the per channel power level from the node output and a current output channel power target;
   adjusting attenuation settings responsive to the difference between the per channel target node gain to the per channel node gain;
   adjusting optical amplifier gain so that per channel attenuation settings are within allowable ranges;
   time-averaging the per channel power levels from the node input and node output, wherein time-averaging decreases the impact of transient changes on the monitored per channel power levels.

2. The nested control loop method of claim 1, wherein the current output channel power target is responsive to provisioned channel output power and channel pre-emphasis.

3. The nested control loop method of claim 1, wherein the adjusting attenuation settings comprises adjusting one of per channel attenuation, per channel group attenuation, and combinations thereof.

4. The nested control loop method of claim 1, wherein the adjusting optical amplifier step comprises reducing the amplifier gain responsive to a maximum value of either a maximum allowable gain change and a maximum attenuation setting above an allowable range.

5. The nested control loop method of claim 1, wherein the monitoring step is performed by an optical channel monitor coupled to a network controller, and wherein the network controller performs the computing and adjusting steps.

6. The nested control loop method of claim 1, further comprising the steps of:
   detecting a relative imbalance in per channel power levels at the node input resulting from a channel dependent gain/loss performance between channels; and
   implementing complementary channel power level adjustments, based on the relative imbalance, at an output at an upstream node(s) so as to minimize the degrading impact of the channel dependence.

7. The nested control loop method of claim 1, wherein the method is configured to maximize the optical amplifier gain to minimize a noise figure of the optical amplifier.

8. An optical node configured with two nested control loops for controlling node gain and node output power to stabilize against nodal gain changes, comprising:
   an optical amplifier;
   attenuation means connected to the optical amplifier, wherein the attenuation means is configured to provide variable attenuation per channel and per group of channels;
   an optical channel monitor configured to monitor per channel optical power at an input to the optical amplifier and an output of the optical amplifier; and
   a node controller in communicatively coupled to the optical amplifier, the attenuation means, and the optical channel monitor, and wherein the node controller is configured to:
      perform an inner, faster, constant node gain control-loop to maintain a constant relative difference between channel power at the input to the optical amplifier and channel power at the output of the optical amplifier; and
      perform an outer, slower, constant output power control-loop to compare the channel power at the output of the optical amplifier to a channel power target for each channel and subsequently make corrections to a target node gain to bring the channel power at the output of the post amplifier equal to the channel power target, wherein the target node gain is utilized by the constant node gain control-loop, and wherein the per channel power levels from the node input and node output are time-averaged to decrease the impact of transient changes on the monitored per channel power levels.

9. The optical node of claim 8, wherein the attenuation means comprises a reconfigurable optical add-drop multiplexer comprising a wavelength selective switch equipped with per port variable attenuation.

10. The optical node of claim 8, wherein the attenuation means is operable to adjust one of per channel attenuation, per channel group attenuation, and combinations thereof.

11. The optical node of claim 8, wherein the node controller is further configured to perform a Pre-Emphasis control loop.

12. The optical node of claim 8, further comprising:
   a second optical amplifier; and
   a reconfigurable optical add-drop multiplexer, wherein the reconfigurable optical add-drop multiplexer is configured to route channels received by the optical amplifier to the second optical amplifier;
   wherein the node controller is configured to perform the constant node gain control-loop and the constant output power control-loop between both the optical amplifier and the second optical amplifier.

13. The optical node of claim 12, wherein the reconfigurable optical add-drop multiplexer comprises the attenuation means.

14. A node controller, comprising:
   a processor communicatively coupled to an optical amplifier, attenuation means, and an optical channel monitor, wherein the processor is configured to:
      time-average per channel power levels at a node input and node output;

compute a per channel node gain based on the difference between output and input per channel power levels;

compute a per channel target node gain, wherein the per channel target node gain comprises the difference between the per channel power level from the node output and a current output channel power target;

adjust the attenuation means responsive to the difference between the per channel target node gain to the per channel node gain; and adjust optical amplifier gain so that per channel attenuation settings are within allowable ranges.

15. A method to stabilize an optical network against nodal gain changes, comprising:

time-averaging per channel power levels at a node input and node output;

computing a per channel node gain based on the difference between time-averaged output and input per channel power levels;

computing a per channel target node gain, wherein the per channel target node gain comprises the difference between the per channel power level from the node output and a current output channel power target;

adjusting attenuation settings responsive to the difference between the per channel target node gain to the per channel node gain; and adjusting optical amplifier gain so that per channel attenuation settings are within allowable ranges.

* * * * *